(12) United States Patent
Seevers

(10) Patent No.: US 12,736,053 B2
(45) Date of Patent: Sep. 15, 2026

(54) ANTIROTATION REED VALVE SYSTEMS AND METHODS FOR COMPRESSORS

(71) Applicant: Copeland LP, Sidney, OH (US)

(72) Inventor: Greg Seevers, West Milton, OH (US)

(73) Assignee: Copeland LP, Sidney, OH (US)

( * ) Notice: Subject to any disclaimer, the term of this patent is extended or adjusted under 35 U.S.C. 154(b) by 0 days.

(21) Appl. No.: 18/970,300

(22) Filed: Dec. 5, 2024

(65) Prior Publication Data

US 2025/0122878 A1 Apr. 17, 2025

Related U.S. Application Data

(63) Continuation of application No. 18/485,712, filed on Oct. 12, 2023, now Pat. No. 12,180,967.

(51) Int. Cl.

| | |
|---|---|
| ***F04C 29/12*** | (2006.01) |
| ***F04C 18/02*** | (2006.01) |
| ***F16K 15/16*** | (2006.01) |

(52) U.S. Cl.

CPC ........ *F04C 29/128* (2013.01); *F04C 18/0215* (2013.01); *F16K 15/162* (2021.08); *F04C 2230/60* (2013.01); *F04C 2240/805* (2013.01)

(58) Field of Classification Search

CPC .... F04C 15/066; F04C 15/068; F04C 29/129; F04C 29/128; F04B 39/1073–1086; F16K 15/16–162

See application file for complete search history.

(56) References Cited

U.S. PATENT DOCUMENTS

| | | | |
|---|---|---|---|
| 2,290,056 | A | 7/1942 | Koubek |
| 3,998,243 | A | 12/1976 | Osterkorn et al. |
| 4,524,806 | A | 6/1985 | Romer |
| 5,203,686 | A | 4/1993 | Scheldorf et al. |
| 5,209,260 | A | 5/1993 | Baek |
| 5,328,338 | A | 7/1994 | Hirano et al. |
| 5,558,508 | A | 9/1996 | Sasano et al. |
| 5,655,898 | A | 8/1997 | Hashimoto et al. |
| 5,672,053 | A | 9/1997 | Sabha |
| 5,779,458 | A | 7/1998 | Hong et al. |
| 5,887,622 | A | 3/1999 | Ahn |
| 6,314,990 | B1 | 11/2001 | Brabek et al. |
| 6,662,775 | B2 | 12/2003 | Hauser |
| 6,679,688 | B2 | 1/2004 | Sato et al. |
| 7,390,176 | B2 | 6/2008 | MacBain et al. |
| 9,382,906 | B2 | 7/2016 | Flanigan |
| 9,964,107 | B2 | 5/2018 | Sadakata et al. |

(Continued)

FOREIGN PATENT DOCUMENTS

| | | | |
|---|---|---|---|
| CN | 115045819 | A | 9/2022 |
| DE | 102021121592 | A1 | 2/2023 |

(Continued)

OTHER PUBLICATIONS

Dhar, Sandeep et al., An Approach Towards Reed Valve Geometry Design, International Compressor Engineering Conference, Paper 2261, Purdue e-Puds, 2014, pp. 1-7.

*Primary Examiner* — Laert Dounis

(74) *Attorney, Agent, or Firm* — Armstrong Teasdale LLP

(57) ABSTRACT

An antirotation valve system for controlling flow through a valve opening defined in a compressor surface. The antirotation valve system includes a reed and a backer each having one mounting opening and one antirotation feature.

20 Claims, 11 Drawing Sheets

(56) References Cited

U.S. PATENT DOCUMENTS

| | | | |
|---|---|---|---|
| 9,989,057 | B2 | 6/2018 | Lochner et al. |
| 12,180,967 | B1 * | 12/2024 | Seevers ................ F16K 15/162 |
| 2005/0135896 | A1 | 6/2005 | Teal |
| 2007/0231167 | A1 | 10/2007 | Tsukamoto et al. |
| 2012/0107164 | A1 | 5/2012 | Kawano et al. |
| 2013/0280113 | A1 | 10/2013 | Miranda et al. |
| 2015/0030484 | A1 | 1/2015 | Rosa |
| 2020/0032797 | A1 | 1/2020 | Lee et al. |
| 2020/0116150 | A1 | 4/2020 | Heaps et al. |
| 2024/0093681 | A1 | 3/2024 | Kuhn et al. |

FOREIGN PATENT DOCUMENTS

| | | | |
|---|---|---|---|
| JP | 2002371965 | A | 12/2002 |
| KR | 19980077162 | A | 11/1998 |
| KR | 19980077165 | A | 11/1998 |
| KR | 100186415 | B1 | 5/1999 |
| WO | 2001038727 | A2 | 5/2001 |

* cited by examiner 244
224
220
228
212
202
250
226
254
264
210
222
242
$L_{210}$
$L_{212}$
$W_{254}$

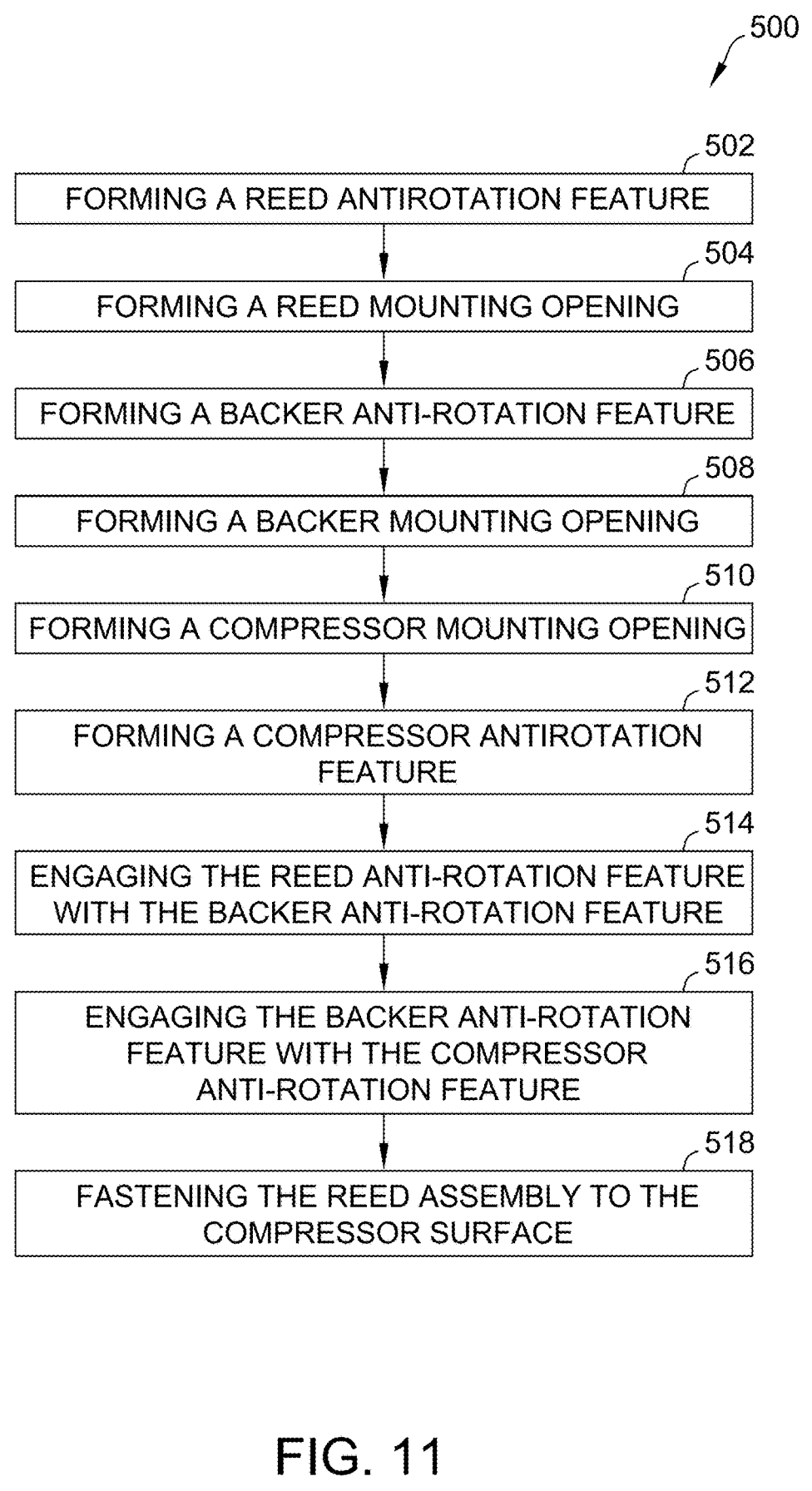

500

502 FORMING A REED ANTIROTATION FEATURE

504 FORMING A REED MOUNTING OPENING

506 FORMING A BACKER ANTI-ROTATION FEATURE

508 FORMING A BACKER MOUNTING OPENING

510 FORMING A COMPRESSOR MOUNTING OPENING

512 FORMING A COMPRESSOR ANTIROTATION FEATURE

514 ENGAGING THE REED ANTI-ROTATION FEATURE WITH THE BACKER ANTI-ROTATION FEATURE

516 ENGAGING THE BACKER ANTI-ROTATION FEATURE WITH THE COMPRESSOR ANTI-ROTATION FEATURE

518 FASTENING THE REED ASSEMBLY TO THE COMPRESSOR SURFACE

FIG. 11

ANTIROTATION REED VALVE SYSTEMS AND METHODS FOR COMPRESSORS

CROSS REFERENCE TO RELATED APPLICATIONS

This application is a continuation of U.S. patent application Ser. No. 18/485,712, filed on Oct. 12, 2023, entitled ANTIROTATION REED VALVE SYSTEMS AND METHODS FOR COMPRESSORS, which is hereby incorporated by reference.

FIELD

This disclosure relates generally to systems and methods for assembling and manufacturing reed valves, and more particularly to reed valves having an antirotation feature for use with compressors.

BACKGROUND

Reed valves are used to regulate flow through a valve opening in the scroll of a compressor. Components of the reed valve assembly are typically mounted to a compressor surface using fasteners, e.g., screws, to prevent the reed valve assembly from rotating relative to the compressor surface. Such prior mounting requires a multi-step manufacturing process that requires tool changes, and assembly techniques that are time consuming and costly.

Improved, cost-effective systems and methods for manufacturing and assembling reed valves in compressors are needed.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

BRIEF DESCRIPTION

In one aspect, an antirotation valve system includes a compressor including a compressor surface defining at least one valve opening and a mounting opening. The valve system includes a reed including a reed mounting opening and a reed antirotation slot. The reed is positionable between an open position where the reed does not obstruct the at least one valve opening and a closed position wherein the reed blocks at least a portion of the valve opening. The valve system includes a backer having a backer mounting opening and a backer antirotation protrusion sized and shaped to engage with the reed antirotation slot preventing rotation between the reed and the backer. The reed and the backer are mounted to the compressor by a fastener extending through the reed mounting opening, the backer mounting opening, and into the compressor mounting opening.

In another aspect, a compressor includes a scroll compressor including a fixed scroll and an orbiting scroll, wherein the fixed scroll includes a compressor surface defining at least one valve opening, a compressor mounting opening, and a compressor antirotation feature. The compressor includes a reed including a reed mounting opening and a reed antirotation feature. The reed is positionable between an open position where the reed does not obstruct the at least one valve opening and a closed position wherein the reed blocks at least a portion of the valve opening. The compressor further includes a backer having a backer mounting feature and a backer antirotation feature sized and shaped to engage with the reed antirotation feature preventing rotation between the reed and the backer. The reed and the backer are mounted to the compressor by a fastener extending through the reed mounting opening, the backer mounting opening, and into the compressor mounting opening.

In yet another aspect, a method of assembly includes providing a reed having an antirotation slot and a single reed mounting opening and providing a backer having an antirotation protrusion sized to engage with the reed antirotation slot and a single backer mounting opening. The method further includes forming a single compressor mounting opening in a surface of the compressor and forming a compressor antirotation opening in the surface of the compressor. The compressor antirotation opening is sized to receive the backer antirotation protrusion.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

FIG. 11 is a flow diagram illustrating an example process for manufacturing and assembling the reed valve assembly shown in FIG. 2.

Corresponding reference characters indicate corresponding parts throughout the drawings.

DETAILED DESCRIPTION

Figure 1:
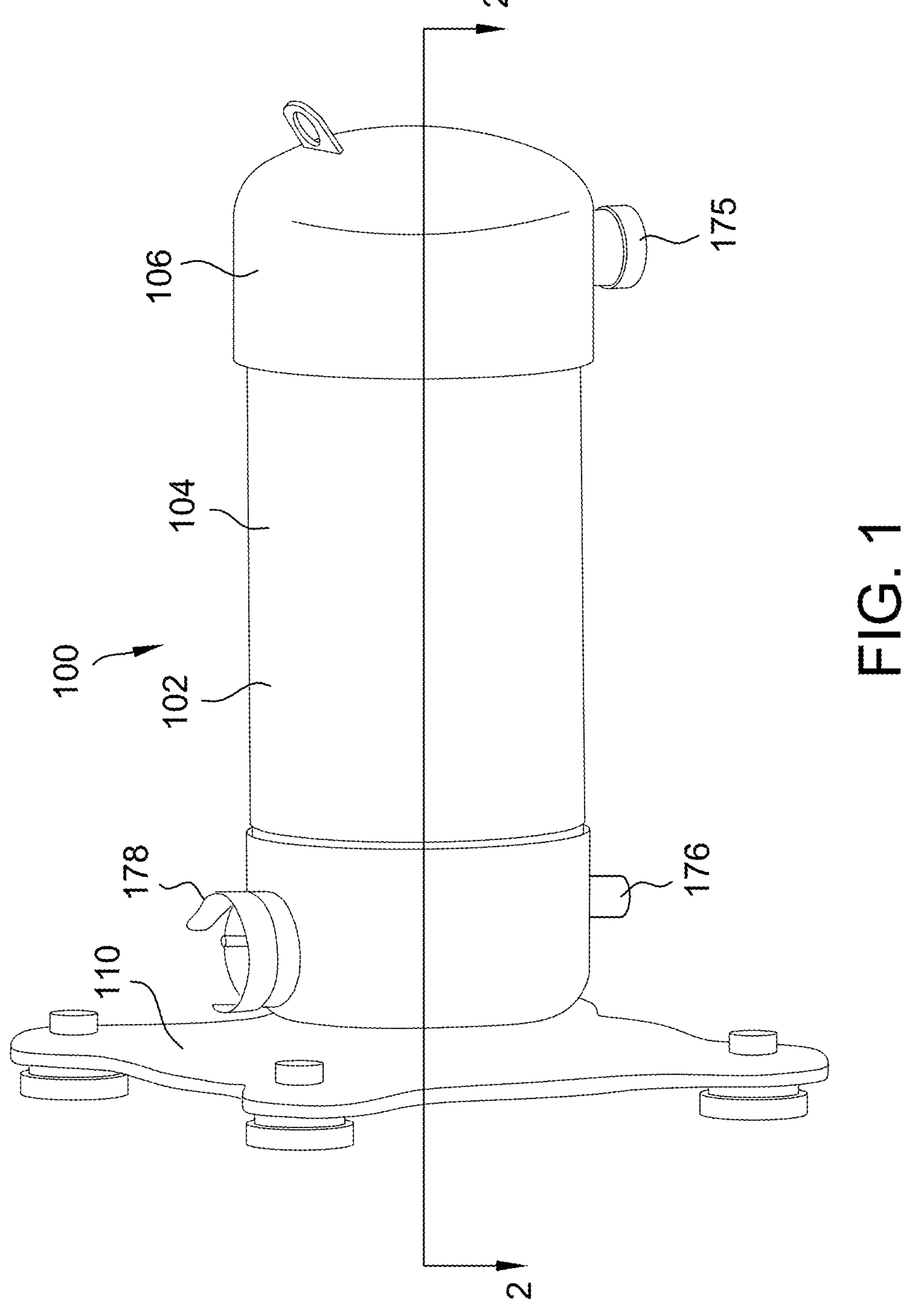
FIG. 1 is a perspective view of a compressor of one embodiment of this disclosure.
Figure 2:
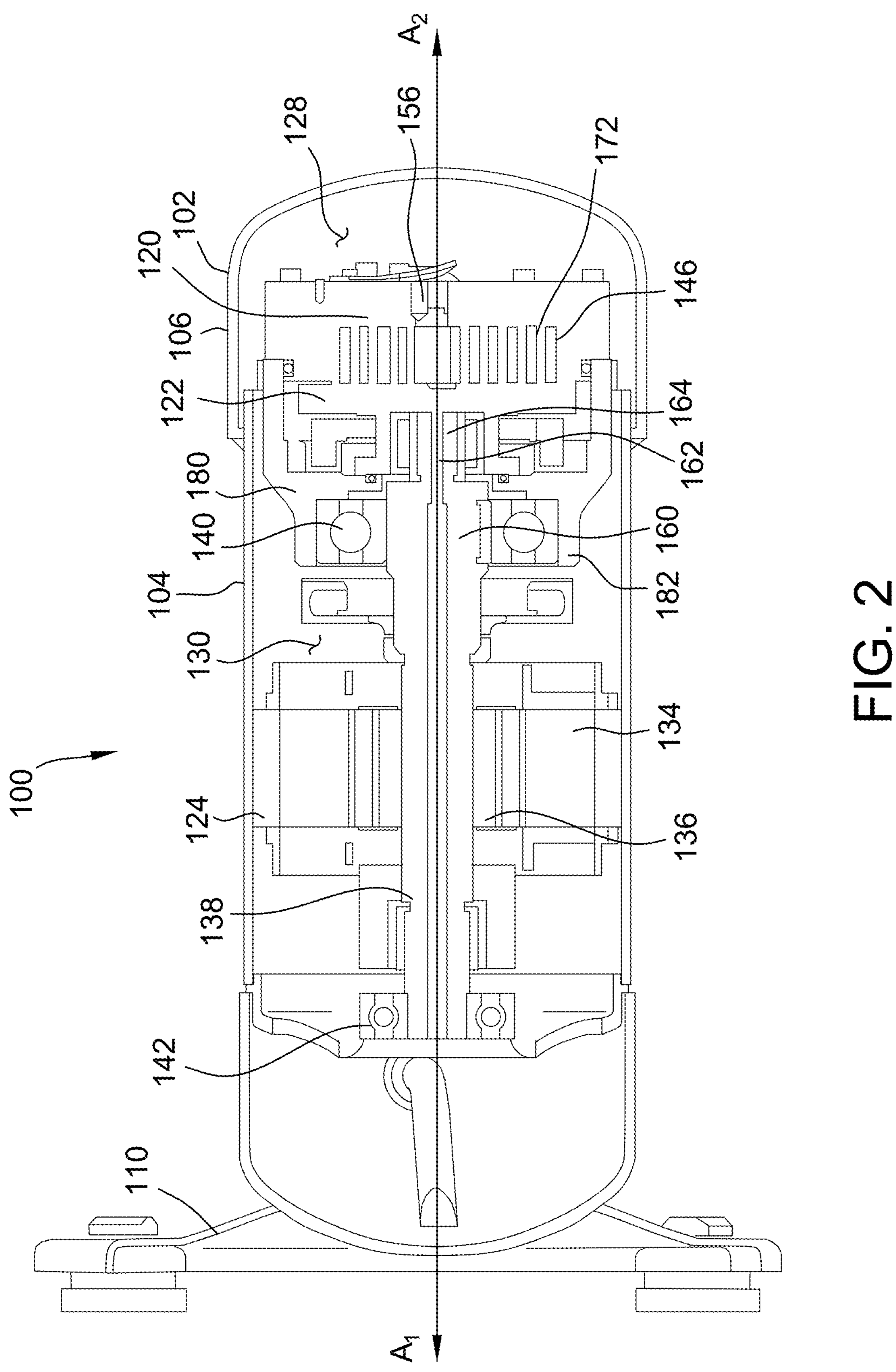
FIG. 2 is a cross-sectional view of the compressor shown in FIG. 1 taken along line 2-2.
Figure 3:
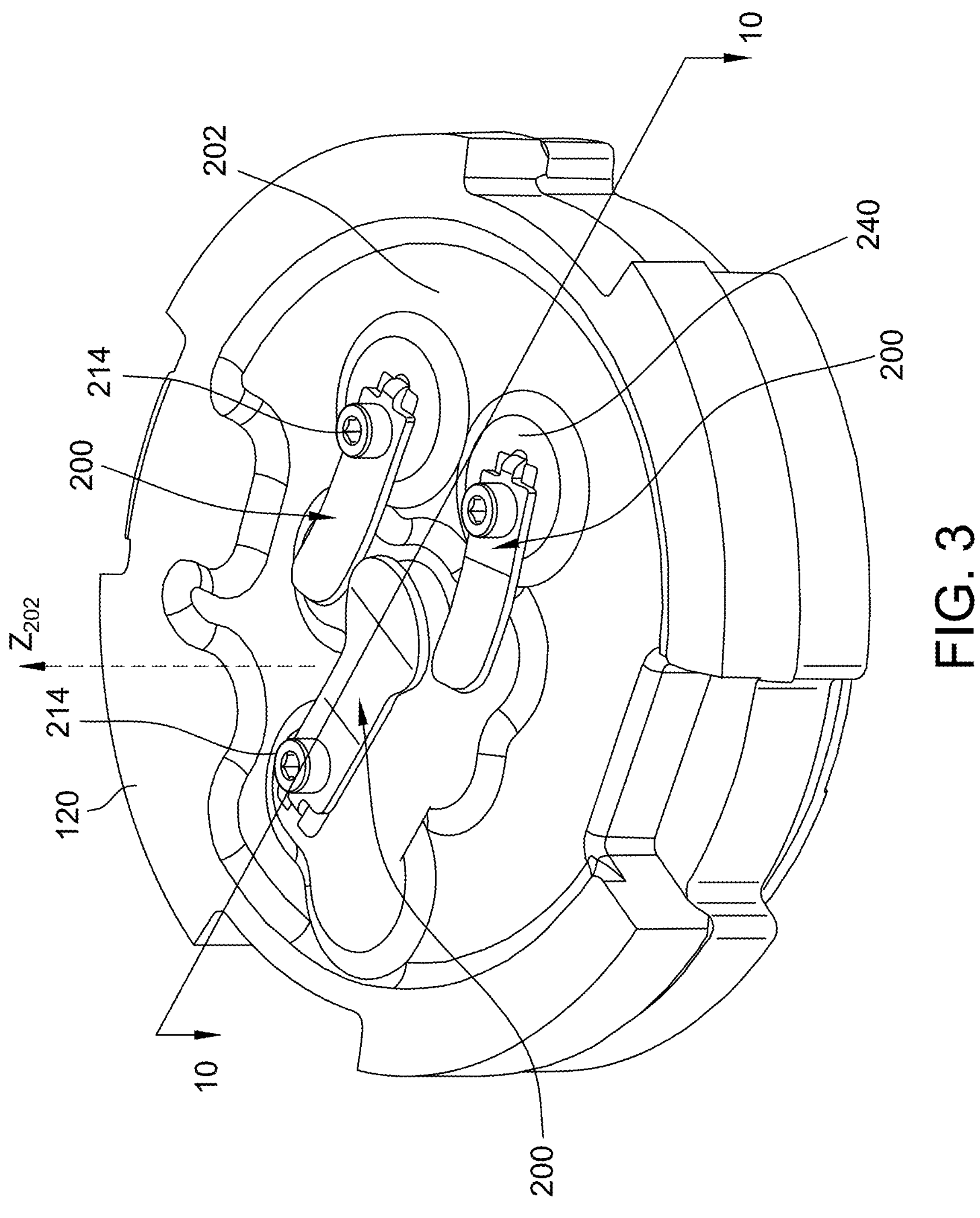
FIG. 3 is a perspective view of a scroll removed from the compressor and including one or more valve openings and a reed valve assembly of one embodiment.

Referring to FIGS. 1-3, a scroll compressor, for use with a reed valve assembly 200, is indicated generally at 100. The compressor 100 includes a compressor housing 102 forming at least one sealed cavity within which refrigerant compression is accomplished. The compressor housing 102 includes a shell 104, an end cap 106 and a base 110 disposed at opposing ends of the shell 104.

The compressor 100 includes a non-orbiting scroll 120 and an orbiting scroll 122 operably engaged with a motor assembly 124. The scroll compressor 100 may be a floating orbit design, a floating non-orbit design such as co-rotating, and related compressor designs. The end cap 106 and the non-orbiting scroll 120 at least partially define a first chamber 128. For example, at least a portion of the shell 104 and/or a muffler plate (not shown) at least partially defines the first chamber 128. The shell 104 at least partially defines a second chamber 130. The motor assembly 124 includes a motor stator 134 and a rotor 136. The compressor 100 also includes a driveshaft 138 that may be press fit within the rotor 136. The rotor 136 transmits rotational power to the driveshaft 138. The motor assembly 124 may be a variable-speed motor for rotating the driveshaft 138 at any of a plurality of speeds. In the illustrated embodiment, the motor assembly 124 is disposed within the shell 104, e.g., within the second chamber 130. In some other embodiments, the compressor 100 may be an open drive compressor driven by a motor assembly that is disposed outside of the compressor housing 102. The compressor 100 further includes a first bearing assembly 140 and a second bearing assembly 142 that may rotationally support the driveshaft 138.

An axial direction includes a direction aligned with, and/or parallel to, the longitudinal axis $A_1$ of the driveshaft body 160. A radial direction includes a direction that is radial relative to the longitudinal axis $A_1$ and perpendicular to the longitudinal axis $A_1$. The driveshaft 138 includes a driveshaft body 160 and an eccentric body 162 that may be projecting from the driveshaft body 160. The driveshaft body 160 and the eccentric body 162 are cylindrical in shape. The eccentric body 162 includes a longitudinal axis $A_2$ that is off set from the longitudinal axis $A_1$. The driveshaft body 160 is rotatably supported by the first and second bearing assemblies 140, 142, respectively. The bearing assemblies 140, 142 may include a roller ball assembly. In other embodiments, the first bearing assembly 140 may include other types of rolling bearings, and/or sleeve/journal bearings. The eccentric body 162 of the driveshaft 138 may be drivingly engaged to a drive bearing 164. The drive bearing 164 transmits rotational motion from the eccentric body 162 to the orbiting scroll 122.

An inlet 175 is attached to the compressor housing 102 in the end cap 106, for drawing the working fluid into the fluid pockets defined by a spiral wrap 172 of the orbiting scroll 122 and a spiral wrap 146 of the non-orbiting scroll 120, where the working fluid is compressed. After the working fluid is compressed, the compressed working fluid exits the fluid pocket defined by spiral wrap of the non-orbiting and orbiting scrolls 120, 122 through a discharge passage and into chamber 128. The compressed working fluid flows from the chamber 128 into chamber 130 through one or more passages between the non-orbiting and orbiting scrolls 120, 122, and the shell 104. The compressed working fluid exits the chamber 130 through a discharge fitting 176. The discharge fitting 176 may be attached to the base 110 of the compressor housing 102. A discharge valve assembly, not shown, may be disposed within the discharge fitting 176 and may generally prevent a reverse flow condition through the discharge fitting 176. A hermetic terminal may be attached to the compressor housing 102 at the base 110.

The compressor 100 may include one or more counterweights attached to the driveshaft body 160 to rotationally balance the driveshaft 138.

In reference to FIG. 3, the non-orbiting scroll 120 includes a compressor surface 202 defining one or more valve openings 204, obstructed from view in FIG. 3 by the valve assembly 200. The valve openings 204 are visible in FIG. 10. Flow through one or more of the valve openings 204, formed through the compressor surface 202, may be regulated by the valve assembly 200. In the illustrated embodiment, the compressor surface 202 is a surface of the non-orbiting scroll 120. The valve assembly 200 may be used to regulate flow through valve openings 204 formed in other and/or alternative surfaces of the compressor 100. The valve assembly 200 may be used to regulate flow through valve openings 204 formed in surfaces of additional and/or alternative devices. The compressor surface 202 may have a vertical axis $Z_{202}$. The valve openings 204 may extend generally parallel to the vertical axis $Z_{202}$.

In reference to FIGS. 5-10, the valve assembly 200 includes a reed 210, a backer 212, and the valve assembly 200 may be mounted to the compressor 100 using a fastener 214. The valve assembly 200 may be mounted to the compressor 100 using a single fastener 214. When the valve assembly 200 is mounted to the compressor surface 202, the reed 210 is disposed between the compressor surface 202 and the backer 212. The backer 212 includes a backer body 220 having a backer thickness $t_{212}$ and extending between a first end 222 to a second end 224 along a backer length $L_{212}$. The backer 212 includes a flat portion 226, that is substantially planar, and an arched portion 228 that is arched relative to the flat portion 226.

The reed 210 includes a reed body 240 extending between a first end 242 and a second end 244. The reed body 240 is substantially planar between the first end 242 and the second end 244 having a relatively constant thickness $t_{210}$. The reed thickness $t_{210}$ may be less than the thickness $t_{212}$ of the backer 212.

When the valve assembly 200 is mounted to the compressor surface 202 at least a portion of the reed 210 is held flat against the compressor surface 202 by the flat portion 226 of the backer 212. A portion of the reed 210 may bend between a closed position and an open position. When the reed 210 is in the closed position the reed 210 substantially obstructs the valve opening 204. When the reed 210 is in the closed position at least a portion of the reed 210 may cover the valve opening 204 and the reed 210 may be in contact with the compressor surface 202 surrounding a perimeter of the valve opening 204. When the reed 210 is in the closed position the reed 210 may lie flat against the compressor surface 202 along the length $L_{210}$ of the reed 210, e.g., the reed 210 is parallel to the compressor surface 202 along the length $L_{210}$ of the reed 210. When the reed 210 is in the open position the reed 210 does not substantially obstruct the valve opening 204. When the reed 210 is in the open position at least a portion of the reed 210 may be flexed away from the compressor surface 202 towards the arched portion 228 of the backer 212.

Figure 4:
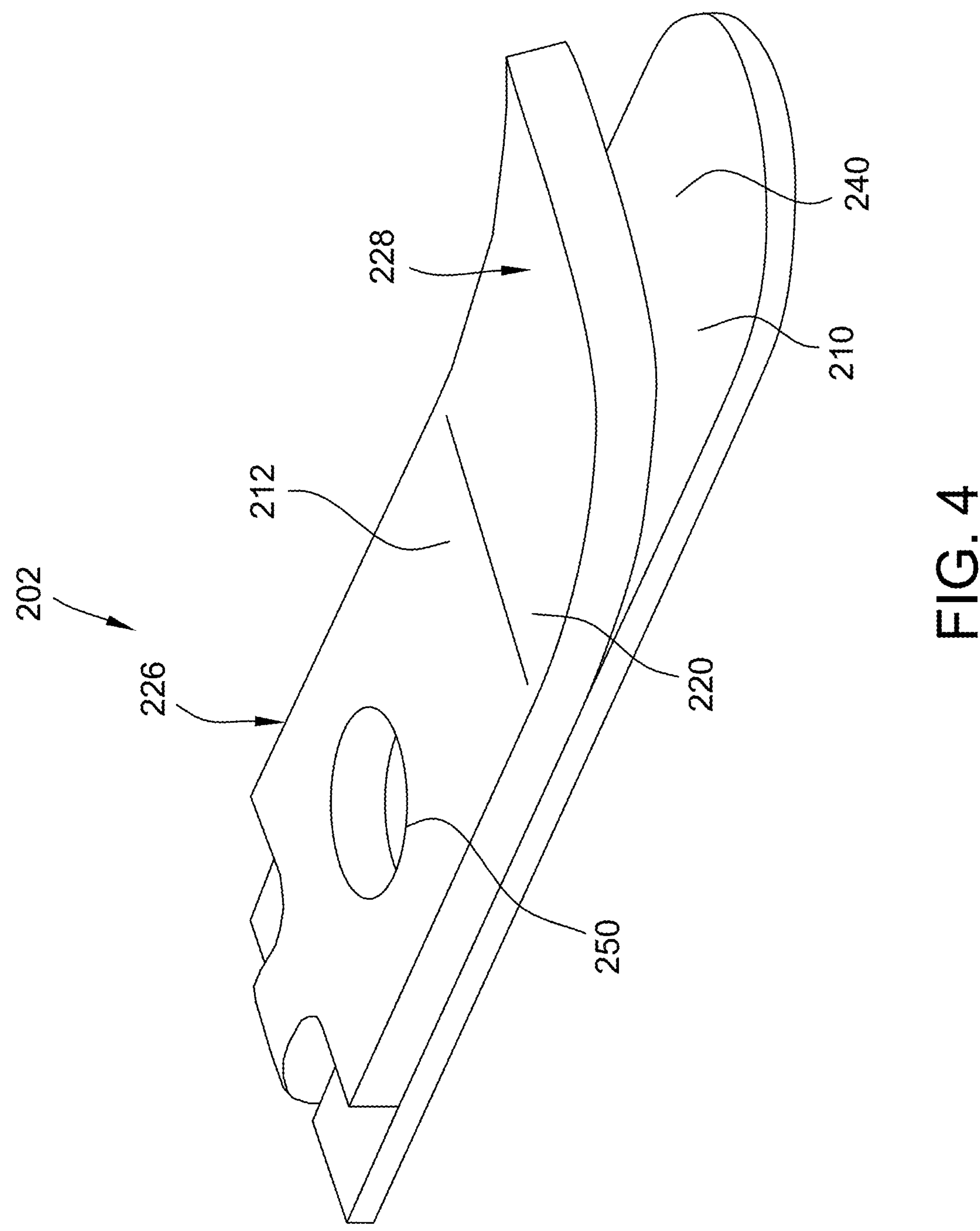
FIG. 4 is a first upper perspective view of the reed valve assembly shown in FIG. 2.
Figure 5:
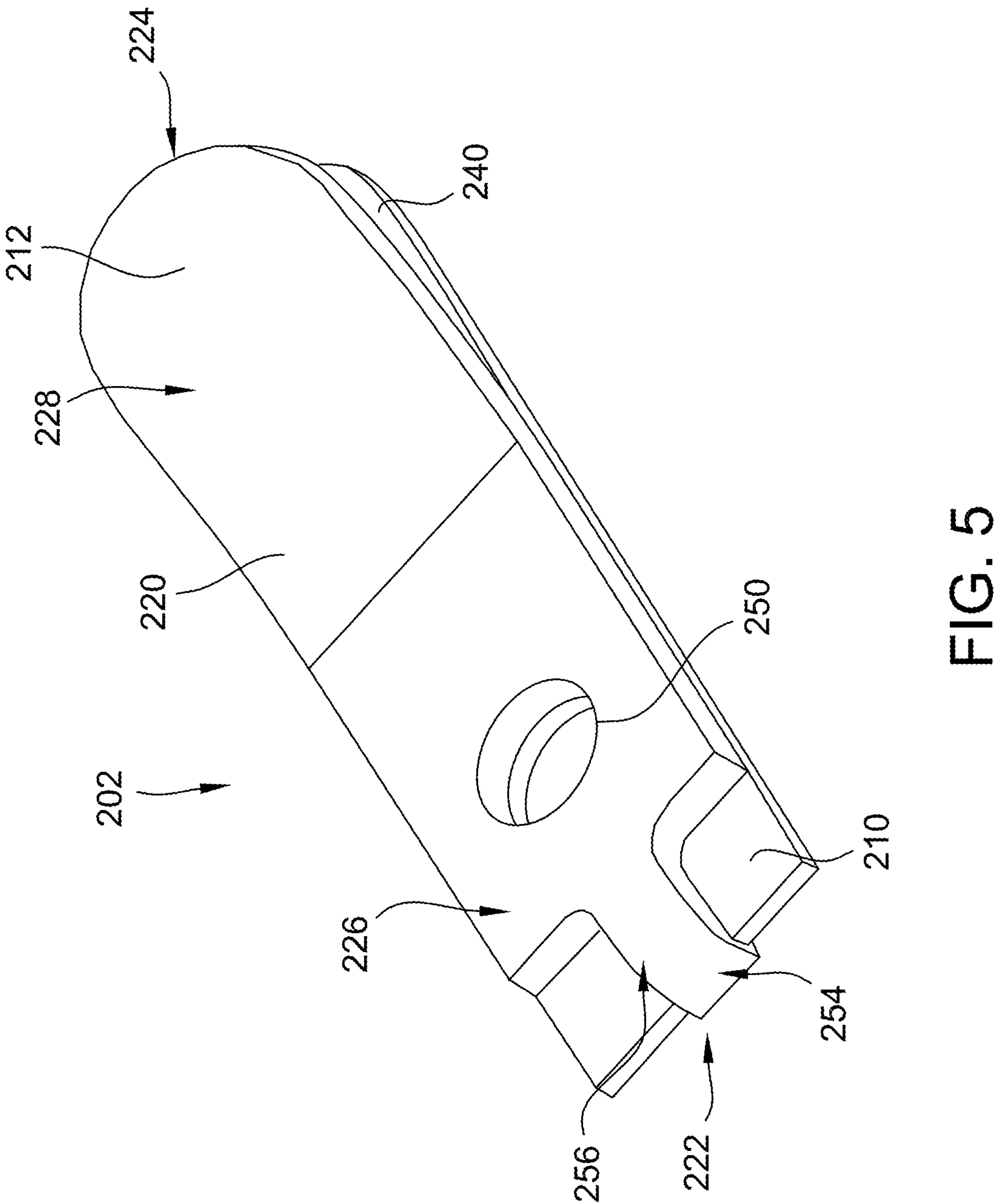
FIG. 5 is a second upper perspective view of the reed valve assembly shown in FIG. 4.
Figure 6:
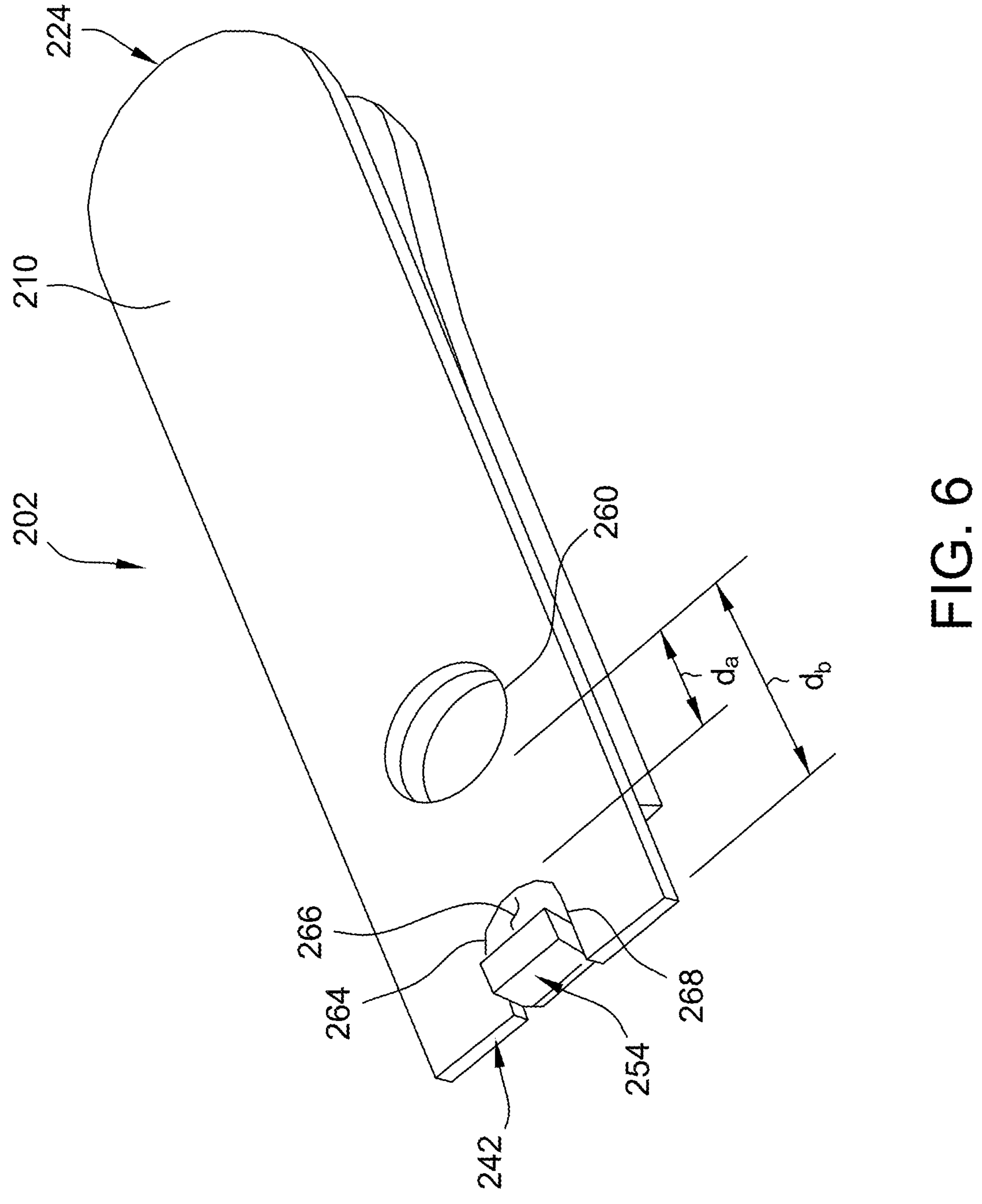
FIG. 6 is a lower perspective view of the reed valve assembly shown in FIG. 4.
Figure 7:
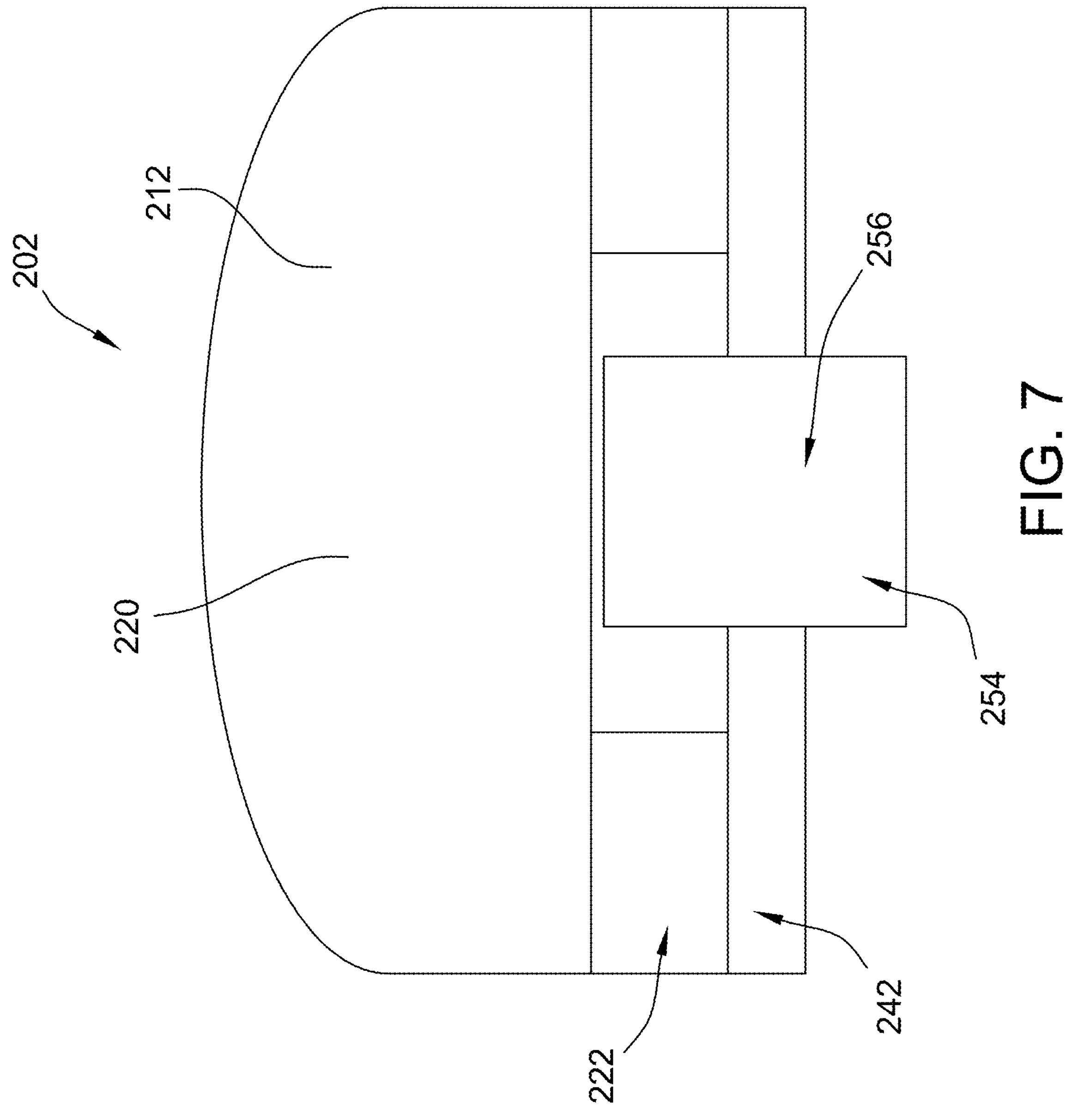
FIG. 7 is a rear view of the reed valve assembly shown in FIG. 4.
Figure 8:
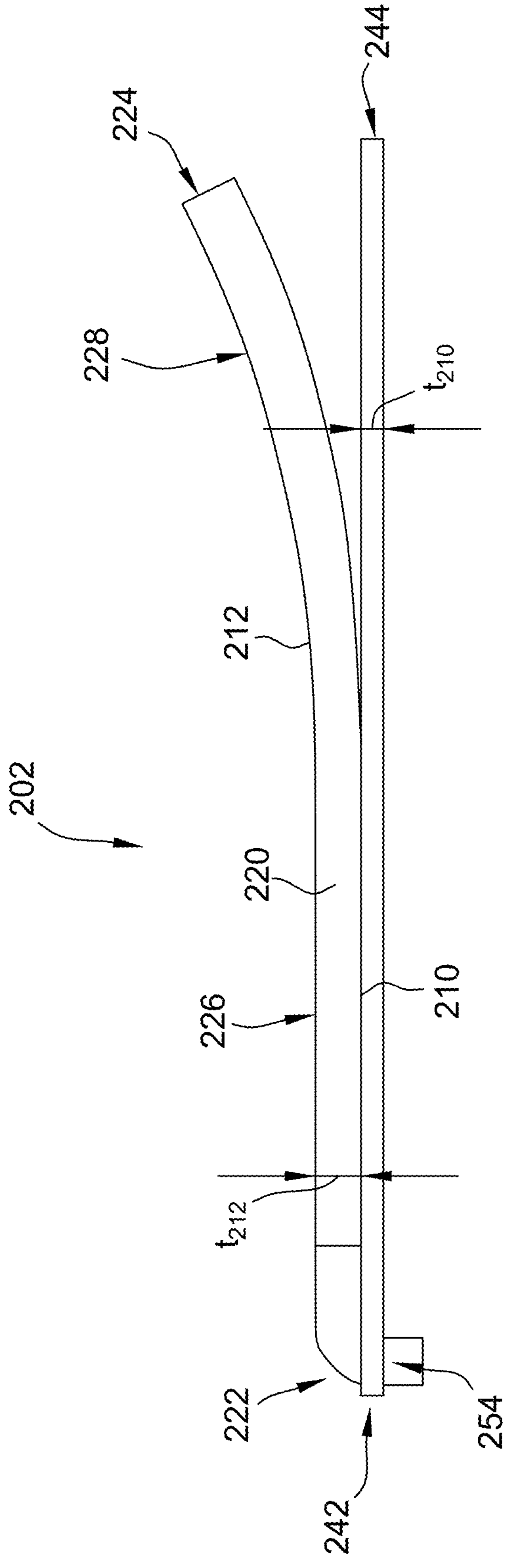
FIG. 8 is a side view of the reed valve assembly shown in FIG. 4.
Figure 9:
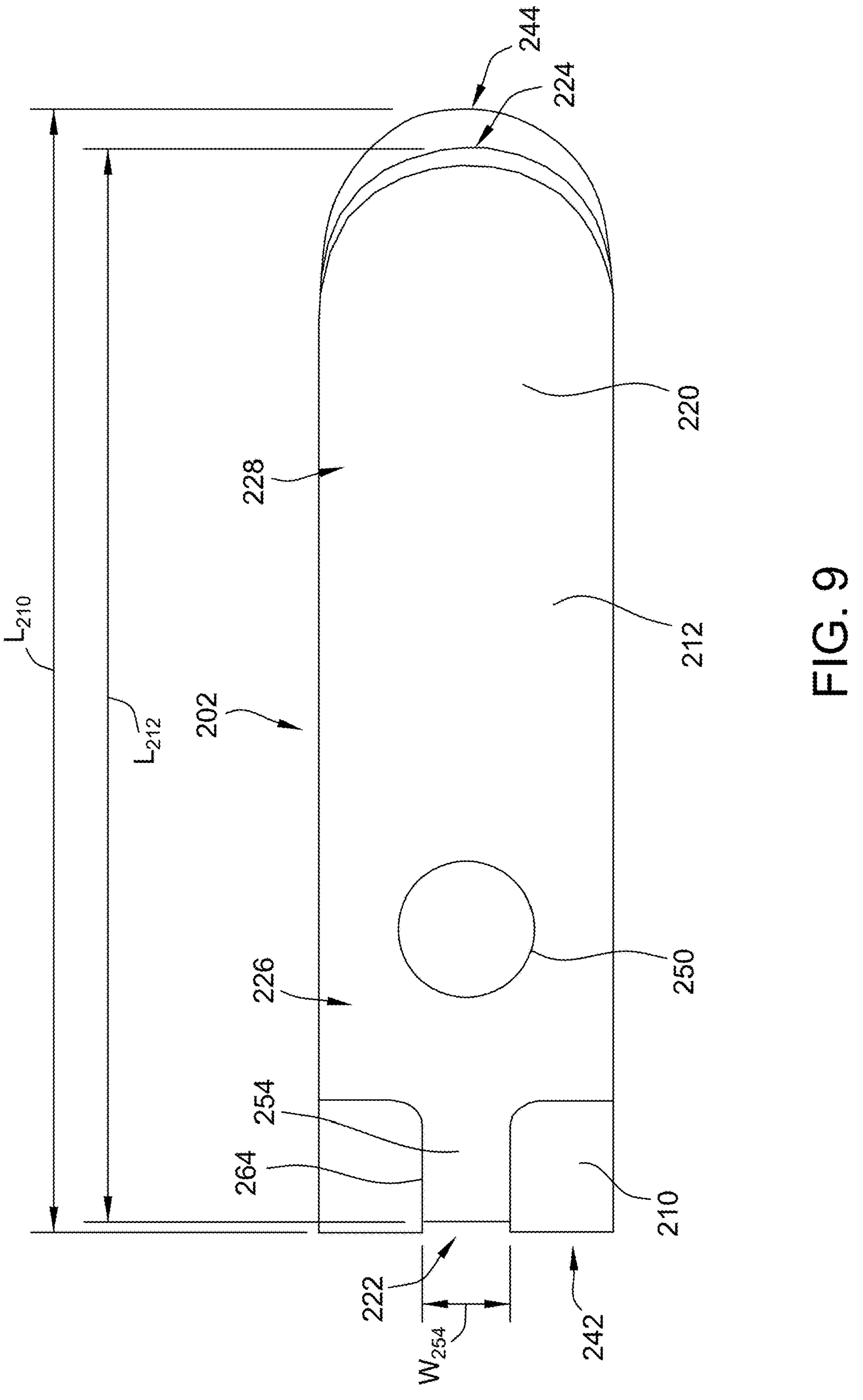
FIG. 9 is a top view of the reed valve assembly shown in FIG. 4.

In reference to FIGS. 4-5, the backer body 220 of backer 212 defines a backer mounting opening 250. The backer 212 of this embodiment includes a single backer mounting opening 250. The backer mounting opening 250 may be formed through the flat portion 226 of the backer 212. The backer mounting opening 250 extends completely through the thickness $t_{212}$ of the backer body 220. The second end 224 of the backer 212 is suitably rounded or curved, having no sharp edges or corners.

The backer body 220 defines a backer antirotation feature 254. The backer antirotation feature 254 of this embodiment is formed into, or is integral with, the backer body 220, near the first end 222 of the backer body 220. The backer antirotation feature 254 may include a tab 256 (e.g., a protrusion) projecting, generally perpendicularly, from the flat portion 226. The backer antirotation feature 254 may be formed by bending the tab 256 of the backer body 220 such that the tab 256 extends generally perpendicularly from the backer body 220. The backer 212 may be formed of any suitable material, e.g., metal, composites, and/or powdered metal blends that have been sintering.

The reed body 240 defines a reed mounting opening 260. The reed 210 of this embodiment, includes a single one of the reed mounting opening 260. The reed mounting opening 260 passes completely through the thickness $t_{210}$ of the reed body 240. The second end 224 may be rounded, having no sharp edges or corners. The reed body 240 also defines a reed antirotation feature 264. The reed antirotation feature 264 may be formed on and/or through the reed body 240 near the first end 242 of the reed body 240. The reed antirotation feature 264 may include a channel 266 (e.g., a slot). The channel 266 may be defined, in part, by an arched or semi-circular boundary 268. The semi-circular boundary 268 may have the same radius of curvature as the radius of curvature of the reed mounting opening 260. As such, a single tool may be used to form the reed mounting opening 260 and the reed antirotation feature 264. The reed antirotation feature 264 may have other shapes and/or dimensions. For example, the reed antirotation feature 264 may include one or more straight edges. The reed antirotation feature 264 may include a boundary that completely encloses the channel 266.

The reed antirotation feature 264 may be separated from the reed mounting opening 260 by a distance $d_a$. The reed mounting opening 260 may be positioned closer to the first end 242 compared to the second end 224. The reed mounting opening 260 may be spaced from the first end 242 by a distance $d_b$. The reed 210 may be formed of any suitable material, e.g., metal, composites, steel, stainless steel, fiberglass, and carbon fiber. The reed 210 may be formed of a material and/or has a suitable shape, e.g., thickness $t_{210}$, such that the reed 210 is flexible.

When the reed 210 and backer 212 are assembled together to form the valve assembly 200, the backer mounting opening 250 and the reed mounting opening 260 are sized and shaped the same and/or substantially the same, e.g., having the same diameter, or having the same diameter within acceptable manufacturing tolerances, e.g., for a diameter of 0.24 inches the tolerance may have a range within ±0.0065 inches. The backer mounting opening 250 and the reed mounting opening 260 may be formed using the same tool. For example, using the same drill bit.

Figure 10:
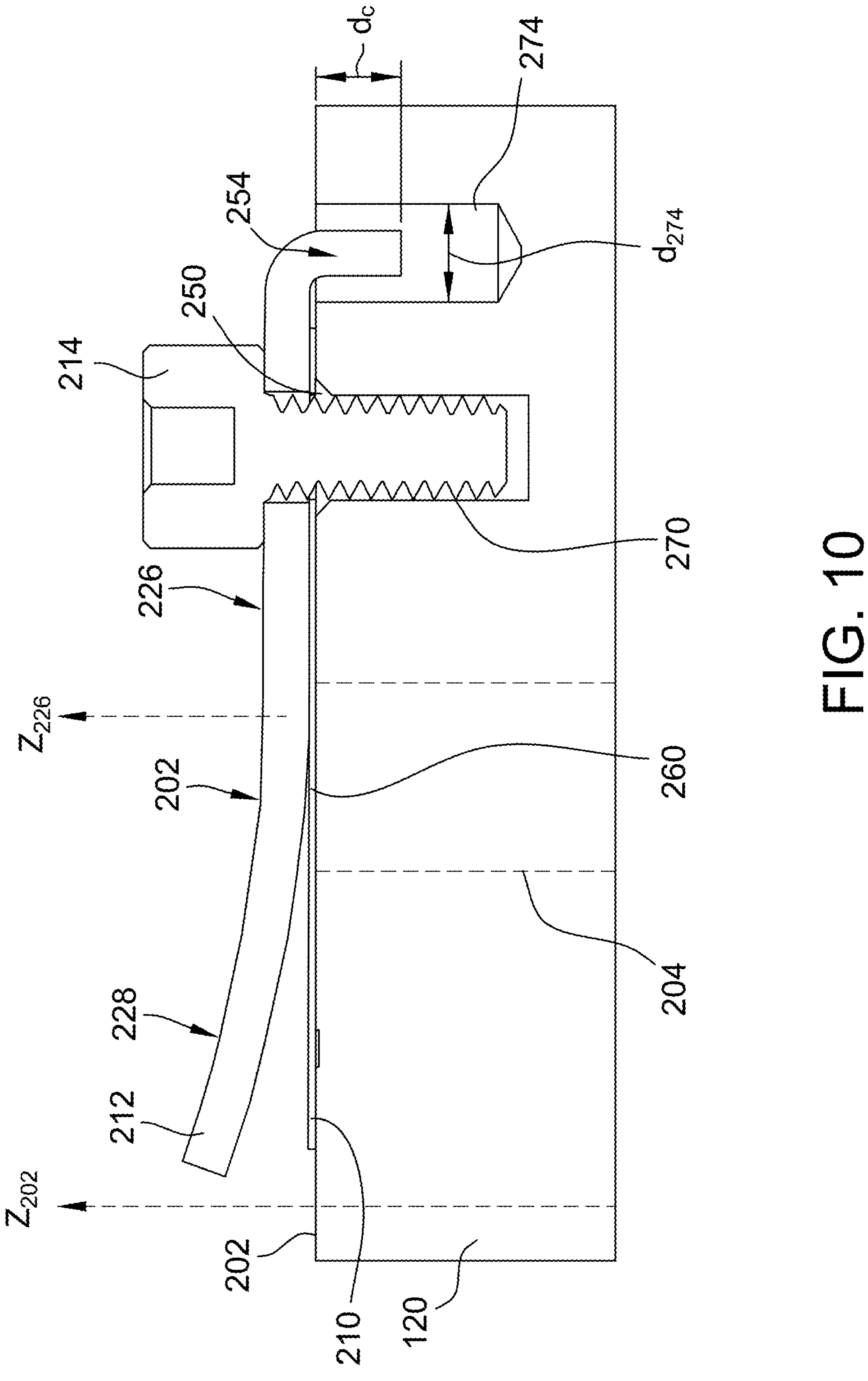
FIG. 10 is a cross-sectional view of the of the scroll and the reed valve assembly shown in FIG. 2 taken along line 10-10.

In reference to FIG. 10, the compressor surface 202 further includes a compressor mounting opening 270 used to mount the valve assembly 200 to the compressor surface 202. For each valve assembly 200, the compressor surface 202 includes a single compressor mounting opening 270. The compressor mounting opening 270 may be a blind bore or a threaded blind bore having a diameter $d_{274}$. The compressor surface 202 may further define a compressor antirotation feature 274. The compressor antirotation feature 274 may be a blind bore or opening formed through the compressor surface 202. The compressor surface 202 may include a single compressor antirotation feature 274 for use with an individual valve assembly 200. The compressor mounting opening 270 and the compressor antirotation feature 274 may have the same shape and size, e.g., the same diameter, and may be formed using the same tool, e.g., a single drill bit. The depth of the compressor mounting opening 270 may be different than the depth of the antirotation feature, e.g., the antirotation feature may have a shallower depth than the depth compressor mounting opening 270.

When the backer mounting opening 250 and the reed mounting opening 260 are aligned, the fastener 214 may be passed through both the backer mounting opening 250 and the reed mounting opening 260 and into the compressor mounting opening 270. The fastener 214 may be a screw, a bolt, a rivet, or any suitable attachment mechanism. The compressor mounting opening 270 may be threaded and the fastener 214 may be threadably engaged with the threads of the compressor mounting opening 270. When the fastener 214 is threaded into engagement with the threaded blind bore of the compressor mounting opening 270, at least a portion of the reed 210 is positioned between the backer 212 and the compressor surface 202.

Additionally, when the compressor mounting opening 270, the reed mounting opening 260 and the backer mounting opening 250 are aligned, the backer antirotation feature 254 may be positioned through the reed antirotation feature 264 and into the compressor antirotation feature 274. The backer antirotation feature 254 may extend into the compressor antirotation feature 274 to a depth of do. The depth do may be substantially the same as the depth of the blind bore compressor antirotation feature 274. The backer antirotation feature 254 may extend into the compressor opening at any suitable depth to maintain the backer antirotation feature 254 within the reed antirotation feature 264 and within the compressor antirotation feature 274. The reed antirotation feature 264 may have a width $W_{254}$ that is substantially the same as the diameter of the compressor antirotation feature 274. The width $W_{254}$ may be slightly less than the diameter $d_{274}$, such that the reed antirotation feature 264 may be press fit into frictional engagement with compressor antirotation feature 274. No tools are needed to assemble the backer antirotation feature 254 with the reed antirotation feature 264 and/or the compressor antirotation feature 274.

FIG. 11 is a process flow diagram of a method 500 for manufacturing and assembling a reed valve assembly, such as the reed valve assembly 200 for use with the compressor shown in FIG. 1 and the reed valve assembly 200 shown in FIG. 3, as an example.

Method 500 of this embodiment includes making (e.g., manufacturing, fabricating, or forming) the reed body 240 using a suitable stamping operation. Such operation may use a stamp or die, for example. A boundary or outline of the stamp may be shaped to cut or stamp out the perimeter of the reed body 240. The reed body 240 is suitably stamped from a substantially planar sheet of metal having a suitable thickness for use as the reed 210. Method 500 also includes forming 502 the reed mounting opening 260. The die may include an outer cutting edge for cutting the outer perimeter of the reed body 240 and an inner cutter having a circular shape for cutting the reed mounting opening 260. Method 500 may include using one or more dies and/or more stamping processes to form the reed body 240. For example, method 500 may include a first stamping process for cutting out the outer perimeter of the reed body 240 and a second stamping process for cutting out the reed mounting opening 260.

Method 500 may include forming 502 the reed antirotation feature 264, e.g., formed as a cutout in the boundary of the reed body 240.

Method 500 includes making (e.g., manufacturing, fabricating, or forming) the backer body 220 using a suitable stamping process using a stamp or die to form the perimeter of the backer body 220 and/or the backer opening from a planar sheet of metal having a suitable thickness for the backer 212. Method 500 includes bending the arched portion 228 of the backer 212 relative to the flat portion 226. Method 500 includes forming 506 the backer antirotation feature 254. Forming 506 the backer antirotation feature 254 may also include bending the tab 256 of the backer 212 approximately 90° relative to the flat portion 226 of the backer 212. Method 500 includes forming 508 the backer mounting opening 250 and/or forming 506 the reed 210 mounting opening 504. In one embodiment, the forming 508 step is a drilling operation using a drill bit, and in one example, this step does not require a tool change. Forming 508 the backer mounting opening 250 and/or forming 506 the reed 210 mounting opening 504 may include a punching process, e.g., using a die and mandrel.

Making the reed 210 and making the backer 212 may include performing any suitable manufacturing process. In some embodiments, making the reed 210 and the backer 212 may include a powdered metallurgy process including preparing and mixing the powdered composite, compacting the powder, and sintering. Making the reed 210 and the backer 212 may include performing a casting process. For example, the backer body 220 and the backer anti-rotation feature 254 may be formed integrally using a casting process such that the backer anti-rotation feature 254 projects outward from the backer body 220.

Method 500 includes forming 510 the compressor mounting opening 270. Forming the compressor mounting opening 270 may include drilling to a depth to form the blind bore. Forming the compressor mounting opening 270 may further include forming threads on the surface of the blind bore. The drill bit used to form the compressor mounting opening 270 may be the same drill bit that is used to form the backer mounting opening 250 and/or the reed mounting opening 260.

Method 500 includes forming 512 the compressor antirotation feature 274. A single tool may be used to form both the compressor antirotation feature 274 and the compressor mounting opening 270. Forming the compressor antirotation feature 274 and forming the compressor mounting opening 270 may be formed sequentially, in either order, without requiring a tool change.

Method 500 includes one or more steps for assembling the valve assembly 200 and attaching the valve assembly 200 to the compressor surface 202. Method 500 suitably includes engaging 514 the reed antirotation feature 264 with the backer antirotation feature 254. Engaging 514 the reed antirotation feature 264 with the backer antirotation feature 254 also includes inserting the tab 256 into the channel 266. Engagement of the reed antirotation feature 264 with the backer antirotation feature 254 restricts rotation, about a vertical axis $Z_{226}$ extending perpendicular to the flat portion 226, between the reed 210 and the backer 212. Method 500 may further include engaging 516 the backer antirotation feature 254 with the compressor antirotation feature 274. Engaging 516 may include inserting the backer antirotation feature 254 into the compressor antirotation feature 274.

When the backer antirotation feature 254 is engaged with the compressor antirotation feature 274, the reed mounting opening 260, the backer mounting opening 250, and the compressor mounting opening 270 are aligned. Method 500 includes fastening 518 the reed 210 assembly to the compressor surface 202. Fastening 518 may include inserting the fastener 214 through the reed mounting opening 260 and through the backer mounting opening 250 and into the compressor mounting opening 270. Method 500 may include threading the fastener 214 into threaded engagement with the compressor mounting opening 270. In some embodiments, the fastener 214 may be press fit into the reed mounting opening 260, backer mounting opening 250, and the compressor mounting opening 270.

Embodiments of the valve assembly described and shown enable reduction of both manufacturing and assembly times, as compared to known methods and systems. For example, the new valve assembly is mounted to the compressor surface using only a single mounting opening that is formed in the reed, the backer, and the compressor surface, and requires only a single fastener. The antirotation features, the reed antirotation feature, the backer antirotation feature, and the compressor antirotation feature, restricts rotation of the valve assembly to maintain the alignment of the valve assembly and the valve opening, without requiring the use of an additional fastener or an additional use of a tool. The anti-rotation features eliminate the need for secondary mounting openings and/or secondary fixtures, per valve assembly, thereby reducing machining and assembly times. The single fastener reduces assembly times compared to conventional systems requiring more than one fastener to maintain the alignment of the reed valve assembly. One or more of the antirotation features may be formed using the same tool that is used to form one or more of the mounting openings, reducing the manufacturing time by not requiring a tool change. For example, a single tool may be used to form the compressor mounting opening and the compressor antirotation feature. In another example, a single tool may be used to form the reed mounting opening and the reed antirotation feature.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a," "an," "the," and "said" are intended to mean that there are one or more of the elements. The terms "comprising," "including," "containing" and "having" are intended to be inclusive and mean that there may be additional elements other than the listed elements. The use of terms indicating a particular orientation (e.g., "top," "bottom," "side", etc.) is for convenience of description and does not require any particular orientation of the item described.

As various changes could be made in the above constructions and methods without departing from the scope of the disclosure, it is intended that all matter contained in the above description and shown in the accompanying drawing [s] shall be interpreted as illustrative and not in a limiting sense.

What is claimed is:

1. An antirotation valve system comprising:

a compressor including a compressor surface defining at least one valve opening, a single compressor mounting opening, and a single compressor antirotation opening;

a reed including a reed body defining a reed mounting opening and a single reed antirotation slot, wherein the reed antirotation slot is formed on a rear boundary edge of the reed body and extends inward into the reed body from the rear boundary edge, wherein the reed is positionable between an open position where the reed does not obstruct the at least one valve opening and a closed position wherein the reed blocks at least a portion of the valve opening; and a backer including a backer body having a rear portion defining a backer mounting opening, and a backer antirotation protrusion extending from the rear portion, wherein the backer antirotation protrusion is sized and shaped to engage with the reed antirotation slot preventing rotation between the reed and the backer, wherein a width of the backer antirotation protrusion is narrower than a width of the rear portion, wherein the reed and the backer are mounted to the compressor by a fastener extending through the reed mounting opening, the backer mounting opening, and into the compressor mounting opening.

2. The valve system of claim 1, wherein the reed is made of a flexible material, and the reed flexes when moving between the open position and the closed position.

3. The valve system of claim 1, wherein the reed antirotation slot includes an arched boundary.

4. The valve system of claim 3, wherein a portion of the arched boundary has the same radius of curvature as a radius of curvature of the reed mounting opening.

5. The valve system of claim 1, wherein the backer antirotation protrusion is sized and shaped to be received within an opening defined at least partially by the reed antirotation slot such that the backer antirotation protrusion extends completely through the opening.

6. The valve system of claim 1, wherein when the reed antirotation slot is engaged with the backer antirotation protrusion, the reed mounting opening is axially aligned with the backer mounting opening.

7. The valve system of claim 1, wherein the single compressor antirotation opening is configured to engage with the backer antirotation protrusion.

8. The valve system of claim 1, wherein when the single compressor antirotation opening is engaged with the backer antirotation protrusion, the reed mounting opening, the backer mounting opening, and the single compressor mounting opening are axially aligned.

9. The valve system of claim 1, wherein the compressor mounting opening is a threaded bore.

10. A compressor comprising:

a scroll compressor including a fixed scroll and an orbiting scroll, wherein the fixed scroll includes a compressor surface defining at least one valve opening, a single compressor mounting opening, and a single compressor antirotation feature;

a reed including a reed body defining a reed mounting opening and a single reed antirotation feature, wherein the reed antirotation feature is formed on a rear boundary edge of the reed body and extends inward into the reed body from the rear boundary edge, wherein the reed is positionable between an open position where the reed does not obstruct the at least one valve opening and a closed position wherein the reed blocks at least a portion of the valve opening; and a backer including a backer body having a rear portion defining a backer mounting feature, and a backer antirotation feature extending from the rear portion, wherein the backer antirotation feature is sized and shaped to engage with the reed antirotation feature preventing rotation between the reed and the backer, wherein a width of the backer antirotation feature is narrower than a width of the rear portion, wherein the reed and the backer are mounted to the compressor by a fastener extending through the reed mounting opening, the backer mounting feature, and into the compressor mounting opening.

11. The compressor of claim 10, wherein the reed is made of a flexible material, and the reed flexes when moving between the open position and the closed position.

12. The compressor of claim 10, wherein the reed antirotation feature includes an arched boundary.

13. The compressor of claim 12, wherein a portion of the arched boundary has the same radius of curvature as a radius of curvature of the reed mounting opening.

14. The compressor of claim 10, wherein the backer antirotation feature is sized and shaped to be received within an opening defined at least partially by the reed antirotation feature such that the backer antirotation feature extends completely through the opening.

15. The compressor of claim 10, wherein when the reed antirotation feature is engaged with the backer antirotation feature, the reed mounting opening is axially aligned with the backer mounting feature.

16. The compressor of claim 10, wherein the single compressor antirotation feature is engageable with the backer antirotation feature, wherein when the single compressor antirotation feature is engaged with the backer antirotation feature, the reed mounting opening feature, the backer mounting feature, and the compressor mounting opening are axially aligned.

17. A method of assembly comprising:

providing a reed including a reed body;

forming a single reed mounting opening in the reed;

forming a single reed antirotation slot in the reed, wherein the reed antirotation slot is formed on a rear boundary edge of the reed body and extends inward into the reed body from the rear boundary edge;

providing a backer including a backer body having a rear portion defining a backer antirotation protrusion extending from the rear portion, wherein the antirotation protrusion is sized to engage with the reed antirotation slot and a backer mounting opening, wherein a width of the backer antirotation protrusion is narrower than a width of the rear portion;

forming a single compressor mounting opening in a surface of a compressor; and forming a single compressor antirotation opening in the surface of the compressor, wherein the single compressor antirotation opening is sized to receive the backer antirotation protrusion.

18. The method of claim 17, the method further includes forming threads in the single compressor mounting opening.

19. The method of claim 17, the method further comprises:

connecting the backer and reed together by engaging the reed antirotation slot with the backer antirotation protrusion.

20. The method of claim 17, the method further comprises:

connecting the backer and the reed together by engaging the reed antirotation slot with the backer antirotation protrusion and connecting the backer and the reed to the compressor by engaging a fastener through the backer mounting opening, through the reed mounting opening and securing the fastener in the single compressor mounting opening.

* * * * *